United States Patent [19]

Klein et al.

[11] 4,045,385

[45] Aug. 30, 1977

[54] FREE-FLOWING UREA RESIN COMPOSITIONS WITH SILANE OR SILOXANE ADDITIVE ADDED BEFORE HARDENING

[75] Inventors: Gerd Klein, Troisdorf-Eschmar; Kurt Schmoll, St. Augustin, both of Germany

[73] Assignee: Dynamit Nobel Aktiengesellschaft, Troisdorf, Germany

[21] Appl. No.: 631,565

[22] Filed: Nov. 13, 1975

[30] Foreign Application Priority Data

Dec. 3, 1974 Germany .............................. 2456979

[51] Int. Cl.² .......................... C08J 3/00; C08L 1/00; C08G 12/12
[52] U.S. Cl. ..................................... 260/15; 260/17.3; 260/37 SB; 260/39 R; 260/39 SB; 260/29.1 SB; 260/69 R; 260/70 R; 260/71
[58] Field of Search ............. 260/69 R, 70 R, 29.2 M, 260/29.15 B, 71, 1.5, 17.3, 37 SB, 39 R, 37 SB; 8/DIG. 1

[56] References Cited

U.S. PATENT DOCUMENTS

| | | | |
|---|---|---|---|
| 2,757,152 | 7/1956 | Solomon | 260/33.451 |
| 2,785,145 | 3/1957 | Cooke et al. | 8/DIG. 1 |
| 3,734,936 | 5/1973 | Brown et al. | 260/39 SB |
| 3,793,302 | 2/1974 | Berstein et al. | 260/39 R |
| 3,888,816 | 6/1975 | Brown et al. | 260/39 R |
| 3,957,718 | 5/1976 | Pochert et al. | 260/39 |

FOREIGN PATENT DOCUMENTS 71,747  3/1970  Germany

OTHER PUBLICATIONS

Chem. Abstracts — vol. 70 — Entry 88509b.

*Primary Examiner*—Joseph L. Schofer
*Assistant Examiner*—Peter F. Kulkosky
*Attorney, Agent, or Firm*—Burgess, Dinklage & Sprung

[57] ABSTRACT

A process for improving the free-flowing qualities of a urea formaldehyde resin which comprises adding to said resin:

A. A polyorganosiloxane having recurring units of the formula $$X(R)_a SiO_{3-a/2}$$

wherein
X is alkyl, alkylene or a hydrocarbon having a functional group;
R is hydrogen, alkyl, alkoxy or aryl;
$a$ is a value from 0 to 2, or a hydrolysis product thereof;

or

B. A silane of the formula $Y-A_n-Si(R'')_b(OR')_{3-b}$ wherein
Y is a substituted or unsubstituted amino, carboxyl, glycidyl, mercapto or alkenyl group;
A is a bivalent straight or branched-chained alkylene radical which can contain oxygen in the chain;
R' is an alkyl or hydroxyalkyl radical;
R'' is a $C_1$-$C_4$ alkyl radical;
$n$ is 0 or 1; and
$b$ is 0, 1 or 2, or a hydrolysis product thereof.

21 Claims, No Drawings

FREE-FLOWING UREA RESIN COMPOSITIONS WITH SILANE OR SILOXANE ADDITIVE ADDED BEFORE HARDENING

BACKGROUND OF THE INVENTION

1. Field of the Invention

This invention relates to a method for rendering urea formaldehyde molding compositions more free-flowing. In particular this invention relates to the application of a polyorganosiloxane or a silane to a urea-formaldehyde resin or urea-formaldehyde resin containing molding composition whereby to render the resultant solid free-flowing urea formaldehyde composition more free-flowing. This invention also relates to a urea-formaldehyde molding composition containing an organopolysiloxane or a silane.

2. Discussion of the Prior Art

It is known that urea-formaldehyde resins, such as those used as binding agents in thermosetting, organically filled molding compositions, display, in contrast to other thermosetting resins, an incipient softening at even moderately elevated temperatures, which results in a certain stickiness in the resins. This has undesirable consequences. For example, in the automatic fabrication of granular, free-flowing urea resin molding compositions, the composition granules stick together and become lumpy under the influence of heat, even in the feed hopper of the fabricating machine, thus losing their free-flowing ability. This can cause trouble by interfering with the precise metering of the composition.

This undesirable agglomeration of the particles can also occur during the storage of the molding composition, especially at temperatures above 25° C and under heavy stacking pressures. Under such circumstances, large, strongly consolidated lumps can form, which make the composition useless for automatic fabrication.

Accordingly, it has become desirable to provide a means for rendering urea-formaldehyde resins more free-flowing. In particular, it has become desirable to provide a means by which the urea formaldehyde molding composition does not become sticky and agglomerate into lumps at elevated temperatures above 25° C such as are experienced during the summer season.

SUMMARY OF THE INVENTION

In accordance with the present invention there is provided a process for improving the free-flowing properties of the urea-formaldehyde resin or a urea-formaldehyde molding composition containing a urea-formaldehyde resin which comprises adding to said resin:

A. A polyorganosiloxane having recurring units of the formula

$$X(R)_a SiO_{3-a/2}$$

wherein

X is alkyl, alkylene or a hydrocarbon having a functional group;
R is hydrogen, alkyl, or alkoxy or aryl;
$a$ is a value from 0 to 2, or a hydrolysis product thereof;

or

B. A silane of the formula $Y-A_n-Si(R'')_b(OR')_{3-b}$
wherein
Y is a substituted or unsubstituted amino, carboxyl, glycidyl, mercapto or alkenyl group;
A is a bivalent straight or branched-chained alkylene radical which can contain oxygen in the chain;
R' is an alkyl or hydroxyalkyl radical;
R" is a $C_1$–$C_4$ alkyl radical;
$n$ is 0 or 1; and
$b$ is 0 or 1 or 2, or a hydrolysis product thereof.

It has now been found that if either polyorganosiloxane having a recurrent siloxane unit of the formula given above, its hydrolysis product, a silane of the above formula or its hydrolysis product is introduced into a composition containing a urea-formaldehyde resin that tendency of the composition to form clumps is counter-active and the free-flowing qualities of the material is insured. Thus by introducing a silicon containing compound of the type described above the free-flowing qualities of a urea-formaldehyde molding composition are maintained.

Silicones in the meaning of this invention are, for example, commercial products in the form of oils or aqueous emulsions whose use as parting agents in the fabrication of plastic compositions and as lubricants in antifriction bearings is known. The silicones are used in the rubber and plastic fabricating industry in a known manner for spraying mold cavities so that the moldings that form therein may more easily be removed from them. As lubricants, the silicones are used on plastic parts and on certain combinations of metallic materials which are to be moved against one another as bearing materials, for the purpose of reducing adhesion. In both these known applications the silicones serve for the surface treatment of plastic or metallic objects for the achievement of separating effects.

The silicones to be used in accordance with the invention are essentially polyorganosiloxanes which are substituted mainly with alkyl and/or aryl radicals of low molecular weight and accordingly have a distinctly silicatic character.

The siloxane units $X(R)_a SiO_{3-a/2}$ that are the basis of these silicones can be monofunctional, difunctional or trifunctional. Accordingly, the index $a$ can assume values between 2 and 0. The radical R in the formula represents alkyl or alkoxy of 1 to 8 carbon atoms, preferably 1 to 4 carbon atoms, identical or different radicals being able to be present per unit. R can also be a $C_6$–$C_{12}$ aryl radical, preferably a phenyl radical or hydrogen.

The radical X can likewise be hydrogen or an alkyl radical of 1 to 8 carbon atoms, preferably 1 to 4 carbon atoms. X, however, can also be an alkenyl radical, e.g., a $C_2$–$C_8$ alkenyl radical. In particular, X can be a vinyl or allyl radical. Additionally, X can represent a hydrocarbon radical with one functional group. Such a hydrocarbon radical can be expressed by the general formula $-CH_2-(CH_2)_z-B$ wherein $z$ can be any value from 0 to 10, preferably 2 to 4 and B represents a functional group such as, for example, the amino or epoxy group or a carboxylic acid ester radical such as a carboxylic acid alkyl ester radical having 1 to 4 carbon atoms in the alkyl group.

Silicones which come under the definition described above are used directly as parting agents in the form of oils or aqueous emulsions. These silicone parting agents are based mainly on polydimethylsiloxanes, which are either in chemically pure form or have part of the methyl groups substituted by hydrogen, aryl radicals and/or other alkyl groups of low molecular weight, with or without functional groups. The silicon parting agents can also contain organo-functional silanes as well as their hydrolysis products. As additives in organically filled urea resins, they bring it about that the resins maintain a free-flowing mass structure, and that the sticking together of particles of the composition is prevented under the influence of increased storage temperature.

The same effect is displayed also by the low-molecular organofunctional and silicon-functional silanes themselves as well as their hydrolysis products. These silanes are characterized by the general formula Y—$A_n$—$Si(R'')_b(OR')_{3-b}$ in which Y, A, R'', $a$ and $n$ have the meaning given above, the radical A being able to contain 1 to 10 carbon atoms and R' representing an alkyl or hydroxyalkyl radical of 1 to 8 carbon atoms, preferably 1 to 4 carbon atoms. The following are examples of usable silanes: γ-aminopropyltrimethoxysilane, γ-aminopropyltriethoxysilane, α-methyl-β-aminoethyltriethoxysilane, N-(β-aminoethyl)-γ-aminopropyltriethoxysilane, γ-methacrylohydroxypropyltrimethoxysilane, γ-glycidylhydroxypropyltrimethoxysilane, vinyltriethoxysilane, vinyl-tris-(β-methoxyethoxy)-silane.

The organically filled ureas resin molding compositions are themselves known substances. They are prepared, for example as follows: urea and formaldehyde are condensed in a molar ratio of 1:1.2 to 1:1.8 in an aqueous alkaline medium at elevated temperature, for example for a period of 40 minutes at a temperature of 50° C. The water is then removed by distillation in vacuo until the liquid resin has achieved the desired density, e.g., a density of about 1.2 g/ml (40° C). This liquid resin is mixed with a hardening accelerator such as zinc sulfite for example, a cellulose containing filler such as wood flour, for example, a pigment such as lithopone, for example, and, if desired, a plasticizer such as dimethylphthalate, for example, and then dried, crushed and granulated. The amount of these additives is proportioned such that the solid resin content in the finished molding compositions amounts to about 55 to 70%.

The addition of silicones or silanes pursuant to the invention can be undertaken before, during or even after the admixture of the additives with the resin. For the achievement of a uniform distribution of the additive in the mass product, the silicones are best stirred into the urea liquid resin in amounts of 0.05 to 1.6 weight percent, preferably 0.2 to 1.2 weight percent, with respect to the urea component, the silicones being used in the form of an emulsion compatible with water when they are not water-soluble. Generally the siloxanes have a molecular weight of 1,000 to 10,000, determined by vapor pressure osmosis.

Whenever the organofunctional silanes or their hydrolysis products used are of low molecular weight, e.g., 100 to 800, the amount of these compounds can vary between 0.8 and 3.0 weight percent, preferably 0.8 to 1.6 weight percent, with respect to the amount of the urea.

The urea resins containing siloxane and/or silane in accordance with the invention are made into thermosetting, organically filled molding compositions in a known manner, such as for example the manner described above.

The granulated compositions obtained in accordance with the invention can be stored at summer temperatures without clumping, and assure constancy of their free-flowing qualities and metering accuracy when they are fabricated on automatic presses and injection molding machines.

In order to more fully illustrate the nature of the invention and the manner of practicing the same the following examples are presented:

EXAMPLES

EXAMPLE 1

3544 parts by weight of a 37% aqueous solution of formaldehyde were heated at 50° C and adjusted with triethanolamine to a pH of 7.2. After the addition of 1944 weight parts of urea, the condensation was performed at the pH value of 7.7 which established itself, and at a temperature of 50° C. After 40 minutes of condensation time, the water was removed by distillation in vacuo until the liquid resin had a density of 1.190 g/ml (40° C).

To each of four individual specimens of this liquid resin such an amount was added of a 35% aqueous silicone separating emulsion consisting of polydimethylsiloxane of an average molecular weight of 5000 that the four resin specimens had siloxane contents of 0.1, 0.2, 0.5 and 1.0%, respectively, with respect to the amount of urea put in. For comparison purposes an additional specimen of the liquid resin did not have any polydimethylsiloxane added.

The five resin specimens were made into molding compositions in the same manner. To this end, 5200 weight parts of liquid resin were combined first with 47 weight parts of zinc stearate, 156 weight parts of zinc sulfite and 245 weight parts of lithopone, and then mixed with 1120 weight parts of cellulose, dried and ground. The powdered molding compositions thus obtained were then granulated all under the same conditions.

The behavior of the composition granules under the influence of elevated ambient temperature was determined by the following short-term test: 250 g of the specimen being tested was placed in a cylindrical glass vessel having a funnel-shaped outlet (ground glass neck NS 14.5/23) and provided with a ground glass connection; it was then covered with a glass plate and exposed for 75 minutes to a test temperature of 60° C in a drying oven. After this exposure to heat the funnel-shaped outlet was opened to determine the amount of composition that poured without lumping through the funnel-shaped outlet.

This test yielded the following results for the five test compositions: the siloxane-free urea composition became very lumpy after its heat treatment and its ability to flow was thus greatly impaired; the amount that poured out was only 35 g. The lumping was markedly lower even in the test composition containing 0.1 weight percent siloxane, and in the compositions containing 0.2, 0.5 and 1.0 weight percent siloxane it no longer took place; the 250-gram specimens of the three last-named compositions flowed completely out of the container after their heat treatment.

EXAMPLE 2

A common commercial 15% aqueous silicone parting emulsion containing mostly polydimethylsiloxane was added to four individual specimens of the liquid urea resin prepared in accordance with Example 1, in such amounts that the silicone content amounted to 0.1, 0.2, 0.5 and 1.0 weight percent, respectively, of the urea content. The resin specimens were made into granules of molding composition under the conditions described in Example 1.

After the heat treatment preformed as in Example 1, the same findings were made with the test compositions as were made with those prepared in Example 1 with the addition of plain polydimethylsiloxane. The compositions with silicone contents beginning at 0.2% of the weight of the urea content formed no lumps and accordingly they exhibited unimpaired free-flowing qualities.

EXAMPLE 3

A 40% aqueous silicone parting emulsion was tested which contained siloxane groups, carboxylic acid ester groups and Si-H groups. This commercial product was added to four individual specimens of the fluid urea resin prepared in accordance with Example 1, in amounts corresponding to a silicone content of 0.2, 0.3, 0.5 and 1.0%, respectively, of the weight of the urea. The resin specimens were then made into granulated molding compositions under the conditions described in Example 1.

After the heat treatment performed in accordance with Example 1, the experimental compositions having a minimum silicone content of 0.3% of the weight of the urea were lump-free and free-flowing.

EXAMPLE 4

Four individual specimens of the fluid urea resin prepared as in Example 1 were treated respectively with 0.5, 0.8, 0.9 and 1.3 weight percent of $\gamma$-aminopropyl-triethoxysilane, with respect to the amount of the urea, and made into granulated molding compositions under the same conditions as described in Example 1.

After the heat treatment performed in accordance with Example 1 the test compositions having a silane content of 0.9 weight percent or more, with respect to the amount of urea, retained their free-flowing structure, and no lumping of the composition particles occurred.

EXAMPLE 5

Batches of composition were prepared and tested as in Example 4, with the sole exception that, instead of $\gamma$-amino-propyltriethoxysilane, N-($\beta$-aminoethyl)-$\gamma$-aminopropyltriethoxysilane was used. As in the case of Example 4, the urea compositions having a silane content of 0.9% or more, of the weight of the urea, remained free of lumping and free-flowing after heat treatment.

EXAMPLE 6

In three embodiments, one mole of $\gamma$-aminopropyltriethoxysilane was hydrolyzed with 0.5 mole, 1 mole and 1.5 moles of water, respectively, the alcohol that formed was removed by distillation, and the mono-, di- and tri-functional siloxanes which formed mainly in each case by condensation were produced.

These three water-compatible siloxanes were stirred into 12 individual specimens of the fluid urea prepared in accordance with Example 1, in amounts of 0.8, 0.9, 1.1 and 1.3% of the weight of the urea. The resin specimens thus obtained were made into granulated molding compositions under the conditions given in Example 1.

After the heat treatment performed as in Example 1, those experimental compositions were lump-free and free-flowing which contained at least 0.9 weight percent of the siloxanes having mainly monofunctionality or difunctionality. When the more greatly crosslinked siloxane was used, the addition of a minimum of 1.1 weight percent with respect to the urea was necessary.

The term "formaldehyde, " as used herein, refers to formaldehyde itself as well as to sources of formaldehyde such as known formaldehyde precursors including paraformaldehyde, hexamethylene tetramine and the like.

The term "urea," as used herein, refers to urea itself as well as known urea precursors including biurea, triuret, thiourea and the like.

What is claimed is:

1. In the manufacture of a urea-formaldehyde molding composition wherein:
A. a liquid urea-formaldehyde resin composition is formed by condensing a urea with a formaldehyde;
B. said resin is combined with a filler; and
C. to said filler containing urea-formaldehyde resin composition there is added a hardening accelerator to harden said composition to a solid urea-formaldehyde molding composition, the improvement for improving the free-flowing qualities of the resultant solid urea-formaldehyde molding composition when heated at elevated temperatures which comprises introducing into said liquid urea-formaldehyde resin prior to hardening:
A. a polyorganosiloxane having recurring units of the formula $$X(R)_a SiO_{3-a/2}$$

wherein
X is alkyl, alkylene or a hydrocarbon radical having a functional group;
R is hydrogen, alkyl, alkoxy or aryl;
$a$ is a value from 0 to 2; in an amount of 0.05 to 1.6 weight percent based on the weight of the urea in the resin
or
B. a silane of the formula $$Y-A_n-Si(R'')_b(OR')_{3-b}$$

wherein
Y is a substituted or unsubstituted amino, carboxyl, glycidyl, mercapto or alkenyl group;
A is a bivalent straight or branched-chained alkylene radical which can contain oxygen in the chain;
R' is an alkyl or hydroxyl alkyl radical;
R'' is a $C_{1-4}$ alkly radical;
$n$ is 0 or 1, and
$b$ is 0, 1 or 2; or a hydrolysis product thereof in an amount of 0.8 to 3.0 weight percent based on the weight of urea in said resin.

2. A process according to claim 1 wherein the silane is added to the urea-formaldehyde resin and
Y is an unsubstituted amino, carboxyl, glycidyl, mercapto or $C_{2-8}$ alkenyl group;
A is a $C_{1-10}$ alkylene radical, and
R' is a $C_{1-8}$ alkyl or hydroxyl alkyl radical 3. A process according to claim 2 wherein R' is a $C_{1-4}$ alkyl or hydroxyl alkyl radical.

4. A process according to claim 1 wherein the polyorganosiloxane is added to the urea formaldehyde resin and R is a $C_{1-8}$ alkyl, $C_{1-8}$ alkoxy, $C_{6-12}$ aryl radical or hydrogen.

5. A process according to claim 4 wherein said hydrocarbon radical having a functional group has the formula —CH$_2$—(CH$_2$)$_z$—B wherein B is a functional group and z is between 0 and 10.

6. A process according to claim 5 wherein B is an amino, epoxy, or carboxylic acid ester radical and z is 2 to 4.

7. A process according to claim 1 wherein a silane is added to said urea formaldehyde resin said silane being selected from the group consisting of γ-aminopropyltrimethoxysilane, γ-aminopropyltriethoxysilane, α-methyl-β-aminoethyltriethoxysilane, N-(β-aminoethyl)-γ-aminopropyltriethoxysilane, γ-methacrylohydroxypropyltrimethoxysilane, γ-glycidylhydroxypropyltrimethoxysilane, vinyltriethoxysilane, vinyl-tris-(β-methoxyethoxy)silane.

8. A process according to claim 1 wherein said siloxane has an average molecular weight of 1,000 to 10,000.

9. A process according to claim 1 wherein to the urea-formaldehyde resin there is added a siloxane.

10. A process according to claim 9 wherein said siloxane is polydimethylsiloxane and it is added to said resin in an amount of 0.2 to 0.8 weight percent, based on the weight of urea in said resin.

11. A process according to claim 1 wherein a silane or hydrolysis product thereof is added to said resin.

12. A process according to claim 11 wherein said silane or hydrolysis product thereof is added in an amount of 0.8 to 1.6 weight percent.

13. A process according to claim 11 wherein the silane is γ-aminopropyltriethoxysilane.

14. A process according to claim 11 wherein the silane is N-(β-aminoethyl)-γ-aminopropyltriethoxysilane.

15. A process according to claim 1 wherein additives are added to said liquid urea-formaldehyde resin and the mixture is dried and granulated following hardening.

16. A process of claim 15 wherein the additives are present in an amount of 30 to 45 percent by weight, based on the weight of the molding composition.

17. A process according to claim 1 wherein the filler is added in an amount of 30–45 weight percent.

18. A process according to claim 1 wherein the filler is an organic filler.

19. A process according to claim 1 wherein said filler containing urea-formaldehyde composition includes a hardener accelerator.

20. A liquid urea-formaldehyde molding composition containing additives and

A. A siloxane having recurring units of the formula

wherein
X is alkyl, alkylene or a hydrocarbon radical having a functional group;
R is hydrogen, alkyl, alkoxy or aryl;
a is a value from 0 to 2; in an amount of 0.05 to 1.6 weight percent based on the weight of the urea in the resin or B. A silane of the formula

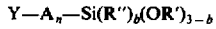

wherein
Y is a substituted or unsubstituted amino, carboxyl, glycidyl, mercapto or alkenyl group;
A is a bivalent straight or branched-chained alkylene radical which can contain oxygen in the chain;
R' is an alkyl or hydroxyl alkyl radical;
R" is a C$_{1-4}$ alkyl radical;
n is 0 or 1, and
b is 0 or 1 or 2;
or a hydrolysis product thereof in an amount of 0.8 to 3.0 weight percent based on the weight of urea in said resin.

21. A molding composition according to claim 20 wherein the additives are present in an amount of 30 to 45 weight percent.

* * * * *